United States Patent [19]

Byers et al.

[11] 4,236,929

[45] Dec. 2, 1980

[54] RAPID STRENGTH DEVELOPMENT IN COMPACTING GLASS BATCH MATERIALS

[75] Inventors: Stanley A. Byers; James R. McKee, Sr.; Marvin C. Gridley, all of Muncie, Ind.

[73] Assignee: Ball Corporation, Munci, Ind.

[21] Appl. No.: 49,026

[22] Filed: Jun. 15, 1979

[51] Int. Cl.$^3$ .............................................. C03C 3/04
[52] U.S. Cl. ........................................ 106/52; 65/18; 65/27; 106/DIG. 8
[58] Field of Search ............... 65/27, 18; 106/DIG. 8, 106/52

[56] References Cited

U.S. PATENT DOCUMENTS 2,220,750   11/1940   Bair et al. ........................... 65/27 X

OTHER PUBLICATIONS

"Granulation and Briquetting of Glass Charges", by Shapakidze et al., Glass and Ceramics, vol. 33, No. 1-2, Jan.-Feb. 1976, pp. 56, 57.

Primary Examiner—Arthur D. Kellogg
Attorney, Agent, or Firm—Gilbert E. Alberding

[57] ABSTRACT

An improved process for producing an acceleration in strength for glass batch materials after they have been compacted as in the form of briquettes. The method comprises forming an intimate mixture of glass-forming materials, admixing therein an alkali metal salt selected from the group consisting of sodium carbonate, potassium carbonate, and sodium sulfate adding between about 4 to about 10 weight percent water to hydrate said alkali metal salt and moisten said glass-forming materials, compacting said moistened materials to individual units, and subjecting the units after their formation to cooling air currents to maintain said freshly formed units at a temperature 90° F., or below for 30 minutes or less.

16 Claims, No Drawings

RAPID STRENGTH DEVELOPMENT IN COMPACTING GLASS BATCH MATERIALS

BACKGROUND OF THE INVENTION

1. Field of the Invention

The subject invention relates to the novel method for the densification of glass-forming materials including, for example, sand, limestone and fluxes, such as soda ash and the like. Moreover, the subject invention particularly relates to the formation of glass-producing materials by compacting the materials into discrete bodies that are shock resistant within a short period of time for subsequent transfer to a glass-producing operation.

2. Description of the Prior Art

In the conventional manufacture of glass, loose glass-forming materials are introduced into a glass-producing furnace, generally in a dry or, if desired, moistened condition. In such operations materials are mixed prior to introduction into the furnace by any of a number of mixing means well-known to the art. Although the glass-forming materials are well mixed, it is generally found that subsequent processing and handling of the mixed loose batch materials often causes segregation. Thus, because of the different densities and particle size of the materials, there is a marked tendency of the various ingredients to settle or separate one from the other. This segregation of the loose glass batch material is objectionable in that nonuniform charges of ingredients are introduced into the furnace. Moreover, in such methods of conveying loose batch materials, there is formation of dust that, to say the least, causes a nuisance in the immediate working area. Further, when introduced into the furnace, the dust associated with the loose batch materials influences melting of the refractory surfaces and clogging of the checkers, as well as flues of the furnace system.

In the past, the problem of dust carry-over and segregation of constituents has been particularly troublesome where very fine particle sizes make up a substantial portion of the batch material. It has been proposed to form discrete units via compacting or agglomerating, wherein the glass batch materials may include binders to cement together the various constituents. In practice, this has been done by simply admixing with the glass batch mixture a suitable binder, such as calcium oxide, sodium hydroxide or sodium silicate in small amounts, and mechanically forming the mixture into the desired discrete units, for example, by molding the mass while in its moldable state, in conventional briquetting machines.

Aside from segregation and dusting problems, it has been found advantageous to compact glass batch materials for other reasons. As relatively inexpensive sources of fuels have come to an end, means for conserving or substantially reducing energy to melt glass batch materials has been extensively investigated. It is known that the melting of raw glass materials to form a typical soda-lime glass is theoretically possible, for example, at about 1600° F., but due to the relatively small surface contact areas between the particles in loose glass batch this theoretical value is not realized. In practice, temperatures in the range of about 2700° F., to 2800° F., are required to homogenize glass at rates necessary to meet demands of high volume production. It is known that by increasing the amount of surface contact between particles via compaction lower temperatures of melting can be approached. By using conventional compacting techniques, such as briquetting, the density of the glass batch materials can be easily increased within a range of about 1.90 to about 2.20 gms/cm$^3$. Since the volume of voids are substantially reduced over dry, loose batch materials, and the contact of particles greater, the ease of melting is significantly enhanced.

Although conventional compacting methods have been employed in the past, it has been found that the compact units so formed, such as briquettes, lack the necessary shock resistance and strength for further processing, especially shortly after their formation. In this regard, the compact units are especially susceptible to breakage or fracture right after their compaction resulting in spillage of their powdery ingredients and fragments. Such breakage is objectionable not only in spillage of materials but also in presenting subsequent processing difficulties, especially where heat transfer and prereaction are contemplated. In these situations it is advantageous that the compact units be uniform in size and that their integrity be maintained with minimum breakage prior to their ultimate introduction into a glass-producing furnace.

U.S. Pat. No. 2,366,473 to Bair relates to forming pebble-like units without special binders by using fluxes, sand with fines and water. Soda ash is disclosed as producing a chemical setting that effectively bonds particles of material together. U.S. Pat. No. 3,065,090 to Hopkins relates to a method of mixing soda ash solutions and sand to produce a wet mixture to form agglomerates. U.S. Pat. No. 3,081,180 to Krinov discloses tumbling a wet mixture of salts and sand to form agglomerates and feeding the same into a glass furnace while at a temperature of between 90° F., and 200° F., to prevent setting of said mixture so as to maintain it in a wet state. U.S. Pat. No. 4,023,976 to Bauer, et al., discloses a briquetting process for glass-producing furnaces wherein glass batch materials are compacted with a binder and are subsequently divided into particulate form prior to briquetting.

SUMMARY OF THE INVENTION

In particular, it is an object of the subject invention to form glass-producing mixtures into meltable units that are readily handled very quickly after their formation without substantial fracture in subsequent glass-making operations.

Another object of the instant invention relates to a method of compacting glass batch materials to obtain shortly after their production discrete bodies that are highly resistant and mechanically relatively strong for handling or storage prior to being transferred to the glass-making operation.

Another object of the subject invention relates to the manufacture and processes therefor to produce a meltable glass-producing mixture in compact forms that can be handled and transported to a glass-producing furnace without breakage or disintegration of said compact forms.

It is also an object of the present invention to provide glass batch materials into compact bodies such as briquettes and the like that during the melting thereof in a glass-producing furnace results in an increase in the overall melting effect and general output in the glass-making furnace.

It is yet another object of this invention to provide a procedure of the indicated kind which leads to significant savings in energy and reduction of the required melting furnace capacity.

DETAILED DESCRIPTION

Briefly, the subject invention relates to a method of preparing glass batch materials from a mixture of ingredients including sand and alkali metal salts, said method comprising adding sufficient water to the ingredients to moisten the mixture to form hydrates of said alkali metal salts, compacting the moistened mixture to form distinct units, and maintaining the units at a temperature and for a time sufficient to retain a predetermined amount of hydration of the alkali metal salts. Further, the subject invention relates to the article formed by this novel method.

Generally, there is no particular order of mixing the glass-forming materials including sand, limestone and fluxes such as alkali metal salts. Further, the mixing of the materials herein described may be accomplished by any conventional means known to the art. Thus, one may employ sundry mixing devices including pug mills, rotary mills, tumblers, mix mullers and other like devices. It is only important that the various ingredients be thoroughly mixed into a homogeneous mixture.

The alkali metal salts that may be used in accordance with the instant invention may be sodium carbonate, potassium carbonate, sodium sulfate, and soda ash or sodium carbonate is a preferred alkali metal salt. The term soda ash is well-known in the art and refers to $Na_2CO_3$ which has not gone through the process of hydration. The soda ash herein contemplated has a bulk density of about 30-65 lbs./ft.$^3$ Light as well as heavy soda ash are contemplated herein. The amount of alkali metal salt added to the batch will determine the quantity of water that is to be added. While the amount of alkali metal salts admixed with a given batch may be subject to considerable variations, it has been found advantageous to employ quantities ranging from between about 10 to 50 percent based on the total weight content, preferably between about 10 and 25 percent by weight.

After the glass batch materials are thoroughly mixed, water is incorporated to moisten and hydrate the alkali metal salts. is incorporated to moisture and hydrate the alkali metal salts. This may be accomplished by simply adding the requisite amount of water to either the dry batch or salts prior to the mixing thereof or during the mixing step. The glass batch materials may be added to the mixing apparatus in any order. The amount of water that may be added to a conventional soda-lime glass batch should be between 4 to 10 weight percent, that is an amount to moisten and hydrate the alkali metal salts and, generally, it has been found advantageous that the water be present in a range between about 0.1 and about 0.55 times the weight of the alkali metal salt in the batch.

It is believed that the water reacts with the alkali metal salts to hydrate the same and, in the case of soda ash, forms hydrates of sodium carbonate that crystallize and apparently remain crystallized at temperatures below 90° F. Seemingly, at temperatures above this there is a loss of strength due, it is believed, to the very lack of ample crystallization. Although it may be recommended that drying be accomplished via heated air in contact with the newly formed bodies, in practice, it has been found that for proper handling of these bodies that cool air, not hot air, be passed in contact with the newly formed bodies. Thus, the water of crystallization or hydration should not be driven off but should be retained to provide adequate strength. By such a process, the integrity and strength is assured in subsequent operations. Moreover, the water so retained does not have any adverse effect in the charging and melting operation of the glass-producing furnace.

The time required for mixing the glass batch materials may vary over a wide range depending on the nature of the batch itself, the quantity of alkali metal salt, and the like. The time required between mixing with water and the subsequent step of compaction is not critical. It has been found that compaction may take place right after moistening the batch with the appropriate amount of water or, if desired, after a period of several hours.

Compacting as used herein is deemed to refer to any method or procedure which results in the formation of densified, discrete masses, units or bodies of glass-making materials. In general, the term compact unit refers to a discrete unit such as a briquette or pillow-shaped body which results from mixed glass-producing mixtures which are readily formed by mechanically compressing into molds of predetermined shape under compacting or densification. Compaction brings the particles closer together as previously explained. Because of the energy imparted into unit formation and the intimate contact of liquid phases containing the alkali metal salt, there is an increase in temperature. This can be recognized in practice in that the units are generally warm to the touch.

In a preferred embodiment of this invention the glass batch materials are briquetted by briquette equipment where the material is compacted between rotating drums. In general, pressure of about 5 tons per lineal inch and above are adequate to form suitable briquettes.

The next stage of the subject invention is a very critical one to the overall process in that the discrete units are exposed to currents of air having a temperature of about 90° F., or less and preferably below 50° F. This condition may be established by any suitable equipment or device which can maintain this temperature. For example, a hood with a fan that can carry in cool air over the freshly compacted unit has been found to be effective. The discrete units are held at this temperature for about 30 minutes or less. This results in increasing the strength of the unit at an accelerated rate over that of merely allowing the unit to exceed the aforementioned maximum temperature, 90° F. It has been found that by force air cooling of the units immediately after their production that the crush strength or resistance to breakage is markedly increased at a significant rate resulting in compact units having substantial strength within a few minutes. Thus, the units formed in accordance with this invention have sufficient strength to withstand subsequent handling via conveyors, belts, elevator, shutes and the like.

The following examples will more specifically define the principles of the present invention, although they should not be interpreted by way of limitation. Although the conditions of operation are made with respect to soda-lime glass, it is understood that the invention may be carried with other types of glasses, such as alkali silicates, borosilicate glasses, and lead glasses.

EXAMPLE 1

A glass batch was prepared having the following:

|  | Wt. % |
| --- | --- |
| Sand | 64.5 |

| | Wt. % |
|---|---|
| Soda Ash | 20.6 |
| Limestone | 14.5 |

The batch was intimately mixed with water in an amount equal to 0.3 times the amount of soda ash (ca. 6% water) in the batch and fed into a conventional briquetting machine to form briquettes. These freshly formed briquettes were placed in a single layer on a screen in ambient air at 67° F. Crushing strengths of briquettes were determined at intervals and yielded results as shown in Table I.

Table I

| | Briquette aging time (minutes) | | | | | |
|---|---|---|---|---|---|---|
| | 0 | 10 | 20 | 30 | 60 | 90 |
| Crush strength (lbs.) average | 25 | 33 | 155 | 285 | 343 | 350 |

The crush strength of these briquettes were measured on a Rimac Spring Tester.

This example illustrates the increase in strength of freshly formed briquettes with setting time after compaction. Acceptable levels of strength, that is strengths of at least 150 pounds or more (strengths that were sufficient to withstand subsequent handling) are not reached until after setting times of at least 20 minutes and preferably greater than 30 minutes.

EXAMPLE 2

A glass batch was prepared as in Example 1, of the same ingredients, mixed with water in an amount equal to 0.3 times the amount of soda ash (ca. 6% water) in the batch and compacted in a briquetting machine. Freshly formed briquettes were placed in a single layer on a screen and subjected to a forced air stream from a fan, with the air at a temperature of 67° F. The briquettes maintained about 6% water after this cooling step. Crushing strengths of briquettes were determined as before, with results as shown in Table II.

Table II

| | Briquette aging time (minutes) | | | | | |
|---|---|---|---|---|---|---|
| | 0 | 10 | 20 | 30 | 60 | 90 |
| Crush strength (lb.) average | 18 | 181 | 318 | 321 | 305 | 284 |

This example shows the effect of an increased cooling rate on the rate of development of briquette strength. Briquettes treated in this way exhibit a greater strength in 10 minutes than do briquettes allowed to age naturally as in Example 1 for 20 minutes. Further processing and handling of briquettes is thus able to begin more quickly.

EXAMPLE 3

A glass batch was prepared as in Example 1, of the same ingredients, mixed with water (ca. 6% water) in an amount equal to 0.3 times the amount of soda ash in the batch and compacted in a briquetting machine. Freshly formed briquettes were placed in a single layer on a screen and subjected to a forced air stream from a fan, with the air at a temperature of 52° F. The briquettes retained about 6% water after the forced air exposure. Crushing strengths of briquettes were determined as before, with results as shown in Table III.

Table III

| | Briquette aging time (minutes) | | | | | | |
|---|---|---|---|---|---|---|---|
| | 0 | 2 | 4 | 6 | 8 | 10 | 20 |
| Crush strength (lb.) average | 20 | 58 | 250 | 309 | 314 | 285 | 346 |

This example demonstrates the effect of cool, forced air on the rate of development of briquette strength. Briquettes subjected to this treatment reach a greater strength in 4 minutes than do briquettes treated as in Example 2 in 10 minutes or briquettes treated in Example 1 in almost 30 minutes.

EXAMPLE 4

A glass batch was prepared as in Example 1, of the same ingredients, mixed with water in an amount equal to 0.4 times the amount of soda ash (ca. 8% water) in the batch and compacted in a briquetting machine. Freshly formed briquettes were placed in a single layer on a screen and subjected to a forced air stream from a fan, with the air at a temperature of 68° F. The briquettes maintained about the same amount of water (8%) after being subjected to forced air treatment. Crushing strengths of briquettes were determined as before, with results as shown in Table IV.

Table IV

| | Briquette aging time (minutes) | | | | | | |
|---|---|---|---|---|---|---|---|
| | 0 | 2 | 4 | 6 | 8 | 10 | 20 |
| Crush strength (lb.) average | 15 | 26 | 75 | 265 | 258 | 339 | 304 |

This example is similar to Example 2, and shows that slightly higher water content in the batch results in a briquette which attains strength more rapidly.

EXAMPLE 5

Glass batch briquettes were prepared as in Example 1, and the freshly formed compacts were placed on a screen in an 8 inch diameter cylinder to a depth of 12 inches. Air at a temperature of 64° F., was drawn through the bed of briquettes at a rate of 342 cubic feet per minute. The briquettes maintained about the same amount of water (8%) after being subjected to forced air treatment. Crushing strengths of briquettes taken from the outlet end of the bed were determined as before, with results as shown in Table V.

Table V

| | Briquette aging time (minutes) | | | | |
|---|---|---|---|---|---|
| | 0 | 2 | 4 | 6 | 8 |
| Crush strength (lb.) average | 20 | 107 | 249 | 248 | 269 |

This example illustrates the fact that more than a single layer of briquettes can be treated to rapidly attain high strengths.

EXAMPLE 6

Glass batch briquettes were prepared having the following:

| | Wt. % |
|---|---|
| Sand | 64.5 |
| Soda Ash | 20.6 |

| -continued | |
|---|---|
| | Wt. % |
| Limestone | 14.5 |

The briquettes were formed and compacted as in Example 1 with about 6% water and subjected to heated air (155° F. and 300° F.) with the results as shown.

Table VI

| | Briquette aging time (minutes) at 115° F. | | | | | | |
|---|---|---|---|---|---|---|---|
| | 0 | 5 | 10 | 20 | 30 | 60 | 90 |
| Crush strength (lb.) average | 14 | 29 | 33 | 38 | 40 | 52 | 66 |

| | Briquette aging time (minutes) at 300° F. | | | | | |
|---|---|---|---|---|---|---|
| | 0 | 2 | 4 | 6 | 8 | 10 | 20 |
| Crush strength (lb.) average | 25 | 35 | 45 | 65 | 72 | 95 | 130 |

This example illustrates the fact that briquettes that were heated after their formation to the temperatures indicated produced briquettes having less strength than those briquettes cooled by temperatures below 90° F. The amount of water that remained in the briquettes heated at 115° F., and 300° F., was 0.1% and 0.0%, respectively.

The above-mentioned briquettes made in accordance with this invention were introduced into a glass-melting furnace with very little breakage of the briquettes and melted easily without foaming and formed good quality glass products.

While specific embodiments of the invention have been shown and described in detail to illustrate the application of the inventive principles, it will be understood that the invention may be embodied otherwise without departing from such principles.

What is claimed is:

1. A method of forming discrete bodies of glass batch materials having high crush strength within about 10 minutes or less after their formation which comprises forming a mixture of glass batch materials including sand, admixing an alkali metal salt therewith, said salt being a member selected from the group consisting of sodium carbonate, potassium carbonate, and sodium sulfate, adding between about 4 to about 10 weight percent water to moisten and hydrate the alkali metal salt, compacting the moistened batch materials to form distinct units, and subjecting said units after their compaction to ambient cooling air currents at a rate sufficient to contact substantially all the distinct units.

2. A method as recited in claim 1 wherein the distinct units are maintained at a temperature below about 90° F., for less than about 10 minutes.

3. A method as recited in claim 1 wherein the retained water of said discrete bodies is between about 4 to about 10 weight percent.

4. A method of claim 1 wherein the compacting includes briquetting the moistened glass materials.

5. A method of claim 1 wherein the temperature is maintained below about 50° F., and the time is less than about 5 minutes.

6. A method of achieving high crush strengths within about 10 minutes or less for glass batch materials in the form of discrete units comprising forming an intimate mixture of glass-forming materials, admixing therein an alkali metal salt selected from the group consisting of sodium carbonate, potassium carbonate, and sodium sulfate, adding between about 4 to about 10 weight percent water to hydrate said alkali metal salt and moisten said glass-forming materials, compacting said moistened materials to discrete units, and continually subjecting the units after their formation to ambient cooling air currents at a rate sufficient to contact substantially all the units to maintain said units at a temperature less than about 90° F., for about 10 minutes or less.

7. A method of accelerating the resistance to breakage of a freshly compacted body having sand, water and alkali metal salt therein, said method comprising cooling said body after compacting to avoid any substantial loss of water therefrom by subjecting the body after its formation to ambient cooling air currents at a rate sufficient to contact substantially all the body.

8. A method of claim 7 wherein the cooling is below 90° F.

9. A method of claim 7 wherein the cooling is below 50° F.

10. A method of claim 7 wherein the compacting is carried out at a pressure of at least about 5 tons per lineal inch.

11. A method of accelerating the resistance to breakage of a freshly compacted body comprising mixing glass batch materials comprising sand, water and alkali metal salt, the amount of water between about 0.1 to about 0.55 times the weight of the alkali metal salt in the batch materials, compacting the glass batch materials into discrete bodies, and passing ambient cool air continually over the freshly compacted bodies at a rate sufficient to contact substantially all of said bodies and to avoid any substantial loss of water therefrom.

12. A method of claim 11 wherein the cooling is below 90° F.

13. A method of claim 11 wherein the cooling is below 50° F.

14. A method of claim 11 wherein the compacting is carried out at a pressure of at least about 5 tons per linear inch.

15. A hard, freshly formed, compact unit of glass batch material made by the process of forming a mixture of glass batch materials, admixing an alkali metal salt therewith, adding sufficient water to hydrate the alkali metal salt, compacting the hydrated batch material to form a distinct, compact unit, and subjecting said unit after its formation to ambient cooling air currents to contact substantially all said unit.

16. A durable, freshly formed, compact briquette having a density of between about 1.90 to about 2.20 comprising sand and limestone made by the process of forming an intimate mixture of glass-forming materials including sand and limestone, admixing therein an alkali metal salt selected from the group consisting of sodium carbonate, potassium carbonate, and sodium sulfate, adding between about 4 to about 10 weight percent water to hydrate said alkali metal salt and moisten said glass-forming materials, briquetting said moistened materials to discrete units, and continually subjecting the units immediately after their formation to ambient cooling air currents at a rate sufficient to contact substantially all of said units and to maintain said units at a temperature of about 90° F., for less than about 10 minutes.

* * * * *